United States Patent Office 2,859,253
Patented Nov. 4, 1958

2,859,253

PROCESS FOR THE CONTINUOUS PREPARATION OF BENZYL CHLORIDE

John E. Snow, Hasbrouck Heights, N. J., assignor to Heyden Newport Chemical Corporation, a corporation of Delaware No Drawing. Application October 19, 1955
Serial No. 541,523

4 Claims. (Cl. 260—651)

This invention relates to a process for producing benzyl chloride and more specifically, to a continuous process for the production of benzyl chloride by the chloromethylation of benzene and to improvements in the process of chloromethylating benzene.

This application is a continuation-in-part of my co-pending application Serial No. 300,758, filed July 24, 1952, now abandoned, which in turn is a continuation-in-part of my application Serial No. 213,047, filed February 27, 1951, now abandoned, and application Serial No. 64,249, filed December 8, 1948, now abandoned.

It has now been discovered that benzyl chloride can be continuously prepared by reacting benzene together with aqueous formaldehyde in the presence of zinc chloride catalyst. The benzyl chloride-containing layer is removed from the reaction mixture and then the aqueous catalyst-containing layer remaining in the reactor is dehydrated and the cycle for the production of benzyl chloride is repeated by the addition of benzene and formaldehyde to the catalyst in the reactor. The efficiency of this process is illustrated by the low losses and consistently high yields obtained.

It also has been discovered that the initial mole ratio of water to zinc chloride materially influences the yield. Surprisingly, if this ratio is in the hereinafter defined range, the yield is not only higher than when relatively more water is present but the yield is higher than when less or even no water is present. In other words, while the presence of a small amount of water apparently reduces the yield below that obtained under anhydrous conditions, the presence of the specified amount of water increases the yield above that obtained under anhydrous conditions.

A highly desirable feature of this process involves dehydration of the catalyst in the reaction vessel at a temperature below 100° C. without the need for removal of the catalyst from the reaction vessel or the necessity for measuring the catalyst concentration. The necessity for measuring the catalyst is overcome by the fact that there is substantially no loss of catalyst under these conditions.

It also has been discovered that the efficiency of the process of chloromethylating benzene in the presence of aqueous formaldehyde and a catalyst such as zinc chloride is greatly increased by using methanol-free aqueous formaldehyde. Normally and unless stated otherwise, commercial N. F. aqueous formaldehyde contains about 6% or more methanol. Methanol-free aqueous formaldehyde normally is used only when required as it has to be carefully handled and stored and is more expensive. Surprisingly, it has been discovered that if methanol-free formaldehyde containing not more than 1% methanol is used, there is an unexpected increase in the production of benzyl chloride.

In a more specific embodiment of this invention, a mixture containing benzene, an aqueous solution of formaldehyde containing about 37% by weight of formaldehyde, and zinc chloride (the water to zinc chloride mole ratio being between about 3.5 to 4.5:1) is heated to a temperature varying between about 58°–63° C. The reaction is carried out by passing gaseous hydrogen chloride into the reaction mixture. The addition of the hydrogen chloride gas to the mixture should be effected rapidly; that is, in as short a time as practicable. This period preferably should not exceed 1½ hours.

The reaction mixture is then cooled, thereby forming two layers. The upper layer containing the benzyl chloride is removed while the lower aqueous catalyst-containing layer is allowed to remain in the reaction vessel. Benzene is added to this lower layer and this is followed by removing the water present in this benzene-zinc chloride mixture as a benzene-water azeotrope. To this dehydrated zinc chloride mixture are added substantially the same quantity of benzene, formaldehyde and water, and the chloromethylation process is repeated once again.

The upper layer which has been drawn off from the reactor is washed with water, then with a dilute solution of alkaline bicarbonate followed by another wash with water. The product is then dried over calcium chloride or some other suitable dehydrating agent and is then vacuum distilled at 60 mm. pressure. The distillate between 96°–98° C. is collected to obtain a benzyl chloride product of high purity.

In this process, it has been found that the initial mole ratio of zinc chloride to water will directly affect the final yield of benzyl chloride obtained. For example, if the initial mole ratio, that is, water to zinc chloride at the beginning of the reaction, is within the limits of 3.5 to 4.5:1 respectively, higher yields of benzyl chloride are obtained. For example, yields of benzyl chloride of 76% or more, based on the amount of formaldehyde charged, can be obtained. By using a preferred ratio of water to zinc chloride, surprisingly the change in the mole ratio of zinc chloride to water during the reaction is minimized, and at the completion of the reaction does not, as a rule, exceed about 6:1. Any variance from the preferred initial ratio, and especially if a mole ratio below 3:1 is used, low yields are obtained. If a ratio is used which is higher than that indicated, the ratio at the end of the reaction will be undesirably high and the yield likewise will be perceptibly lower. If the zinc concentration is low, complete reaction with the formaldehyde will not be effected and in addition, undesirable side reactions may produce polymeric compounds of formaldehyde and benzene.

As used herein, the term "substantially methanol-free formaldehyde" refers to aqueous formaldehyde not containing more than 1% by weight of methanol. Aqueous formaldehyde of different concentrations may be used. However, the amount of water present in the aqueous formaldehyde and the added water, if any, must be taken into consideration when calculating the mole ratio of water to zinc chloride. The expression "aqueous formaldehyde" is not intended to include paraformaldehyde which would be an unduly expensive source of formaldehyde.

By removing the benzyl chloride layer and then adding the chloromethylation reactants to the dehydrated zinc chloride in the reactor, the chloromethylation process is continuous in nature.

While this invention can be carried out in various ways, for the purpose of illustration I have described hereinafter only certain examples of the procedure for this purpose. All percentages are by weight. The yield of benzyl chloride is based on the amount of formaldehyde charged.

EXAMPLE I

Three hundred parts (3.85 moles) of benzene, 81 parts (1 mole) of 37% substantially methanol-free formaldehyde, and 100 parts (0.74 mole) of pulverized fused U. S. P. zinc chloride were charged into a one-liter, three-neck, round-bottom flask equipped with theromometer, air-driven Hershberg Nichrome wire stirrer, and gas inlet tube. The ingredients were stirred and then heated to 60° C. before the addition of gaseous HCl was begun. The temperature was held at 60° C. while HCl was passed over the surface of the rapidly stirred charge for 1½ hours to effect chloromethylation of the benzene. The reaction mixture was cooled to 27° C. and the layers separated. The upper layer was washed with water, 5% sodium bicarbonate solution, and again with water and then dried over $CaCl_2$. It was then stripped of benzene and vacuum distilled to yield at 96–98° C./60 mm., 99.9 parts of benzyl chloride. This amounts to 78.9% of the theoretical yield. Chlorine percentage on analysis was 27.96% (theory 28.1%).

To the lower layer was added about 1 mole of benzene. The mixture was heated under reflux until the zinc chloride was substantially dry. Ninety three ml. of water were collected in a modified Dean and Stark moisture trap. The benzene can be reused. The addition of benzene is highly desirable as the benzene aids in removing the water. It was possible to remove substantially all of the water at a temperature below the boiling point of water, that is, about 80° C. Without the benzene, it is necessary to heat the mixture to a much higher temperature at which the small amount of organic residue apparently decomposes and contaminates the catalyst. It was found in practice that better results were obtained when benzene was added to the aqueous catalyst layer.

To the dehydrated benzene-zinc chloride mixture was added 300 parts (3.85 moles) of benzene and 81 parts (1 mole) of 37% methanol-free formaldehyde. The chloromethylation reaction was carried out as described above. This time the yield was 103.7 parts of benzyl chloride, 81.8% of theory. Chlorine percentage on analysis was 27.84% (theory 28.1%).

Once again benzene was added to the aqueous layer, and the mixture was refluxed until 96 ml. of water had been collected in the water trap.

The regenerated zinc chloride was used in a third chloromethylation run. The yield of benzyl chloride was 99.4 parts (78.8% of theory). Chlorine percentage on analysis was 27.72%.

The above runs were repeated with the following results:

First chloromethylation—99.3 parts of benzyl chloride (78.4% of theory). Chlorine analysis 27.86%.
Second chloromethylation—101.8 parts of benzyl chloride (80.5% of theory). Chlorine analysis 27.92%.
Third chloromethylation—100.9 parts of benzyl chloride (79.6% of theory). Chlorine analysis 27.80%.

Additional experiments were performed to determine the correlation between the initial concentration of benzene and the yield of benzyl chloride obtained. The results are as follows (the runs were made using 100 grams of zinc chloride and 1.0 mole 37% methanol-free formaldehyde):

| Quantity of Benzene | Percent Yield Benzyl Chloride |
| --- | --- |
| 400 g | 81.5 |
|  | 81.6 |
| 300 g | 81.0 |
|  | 80.0 |
| 200 g | 79.8 |
|  | 78.0 |

To illustrate the fact that the most satisfactory yields are obtained in this reaction when the water is present at the beginning and at the end of the reaction in certain definite ratios to the amount of zinc chloride used, the following experiments were performed.

*Variation in yield of benzyl chloride with change in the molar ratio of water to zinc chloride at end of the reaction [1]*

| Grams Zinc Chloride Used | Percent Yield Benzyl Chloride | Analysis of Benzyl Chloride [2] | | Grams Residue | Calculated Molar Ratio of Water to Zinc Chloride | |
| --- | --- | --- | --- | --- | --- | --- |
|  |  | Percent Cl | Percent HCHO |  | At Start of Reaction | At End of Reaction |
| 80 | 68.8 | 28.1 | None | 6.0 | 4.82:1 | 6.52:1 |
|  | 69.4 | 27.87 | 0.05 | 8.1 |  |  |
| 90 | 80.3 | 27.67 | None | 14.6 | 4.30:1 | 5.80:1 |
|  | 82.0 | 27.85 | None | 12.5 |  |  |
| 100 | 80.4 | 28.02 | None | 11.5 | 3.85:1 | 5.20:1 |
|  | 81.6 | 28.0 | None | 9.7 |  |  |
|  | 81.5 | 28.18 | None | 10.3 |  |  |
| 110 | 77.6 | 27.8 | 0.03 | 13.4 | 3.5:1 | 4.73:1 |
|  | 79.8 | 27.4 | 0.03 | 16.4 |  |  |
| 120 | 75.7 | — | — | 9.6 | 3.22:1 | 4.35:1 |
|  | 73.2 | — | — | 6.5 |  |  |
| 150 | 60.5 | 27.8 | None | 14.5 | 2.57:1 | 3.48:1 |
|  | 57.4 | 28.1 | None | 11.9 |  |  |

[1] All runs on one mole 37% formaldehyde basis.
[2] Theoretical for benzyl chloride 28.1% Cl; 0.0% HCHO.

As indicated, only a single reactor has been used in this process for the continuous production of benzyl chloride. Since the catalyst regeneration step is more time-consuming than the chloromethylation step it is quite possible, however, to use two or more reactors thereby staggering the cycles in this proposed modification.

As previously indicated, it is highly desirable that benzene be added to the aqueous zinc chloride layer in the reactor after removal of the benzyl chloride and before dehydrating the catalyst. The amount of benzene may be varied widely although excellent results have been obtained when the number of moles of added benzene are about equal to the number of moles of zinc chloride. With benzene added, it is possible to effect dehydration by heating the mixture in the reactor to a temperature below 100° C. to remove the water as a benzene-water azeotrope; whereas, zinc chloride is customarily completely dehydrated by heating the zinc chloride to its melting point to effect fusion. Zinc chloride is very hygroscopic. During dehydration, the added benzene is removed along with the water and the benzene can be separated and reused. While it would not be necessary to substantially completely dehydrate the catalyst if formalin containing a higher percentage of formaldehyde were added to the regenerated catalyst, this would in practice involve a number of difficulties. One difficulty would be that solutions of different aldehyde concentrations would have to be prepared and used. In addition, the residual water should be measured to assure the proper ratio of water to zinc chloride in the reaction mixture. Accordingly, it is quite desirable to dehydrate substantially completely the zinc chloride in the reactor before adding additional water, formaldehyde and benzene.

EXAMPLE II

Four hundred parts (5.14 moles) of reagent grade benzene, 100 parts (0.735 mole) of pulverized zinc chloride, and 81 parts (1 mole) of 37.1% formaldehyde, were placed in a flask equipped with a stirrer and a reflux condenser. The mixture was stirred and heated to about 60° C. and gaseous hydrogen chloride was bubbled into the reaction mixture at an average rate of approximately 2 moles per hour. The temperature of the reaction mixture was maintained at about 60° C. by cooling. The reaction was substantially complete at the end of one hour, although the addition of hydrogen chloride gas with stirring was continued for an additional fifteen minutes. The reaction mixture was cooled to 25° C. The lower aqeous zinc chloride layer was removed. The upper layer containing benzene, benzyl chloride and other reaction products, was washed with water, then with a 5% sodium bicarbonate solution and again with water. The washed benzene solution was dried and 276.1 parts of benzene were removed by distillation at atmospheric pressure. Vacuum distillation of the residue gave 102 parts of benzyl chloride which was 81.5% of the theoretical amount.

EXAMPLE III

In this comparative example, the procedure was the same as described in Example II except that the aqueous formaldehyde contained 7.2% methanol. The yield was only 70.7%.

Some of the features of the present invention may be employed without others. However, best results are obtained when all of the features are combined to form the optimum process.

I claim:

1. In a process for preparing benzyl chloride in high yield, the steps comprising chloromethylating benzene to form benzyl chloride in a reaction vessel by passing gaseous hydrogen chloride into an aqueous reaction mixture containing benzene and substantially methanol-free aqueous formaldehyde in the presence of zinc chloride, the initial molar ratio of water to zinc chloride in the reaction mixture being between 3.5 to 4.5:1, cooling the mixture, removing the upper layer of the mixture containing benzyl chloride while allowing the catalyst-containing aqueous lower layer to remain in the reaction vessel, separating benzyl chloride from the removed upper layer, regenerating the catalyst in the aqueous lower layer remaining in the reaction vessel by adding benzene to the layer followed by substantially completely dehydrating the resultant mixture by azeotropic distillation at atmospheric pressure and at a temperature below 100° C., adding benzene, water and such an aldehyde to the regenerated catalyst in the reaction vessel, the molar ratio of water to zinc chloride in the reaction mixture varying between 3.5 to 4.5:1, and then repeating the chloromethylating step to obtain an additional quantity of benzyl chloride.

2. In a process for continuously preparing a quantity of benzyl chloride in high yield, the steps comprising chloromethylating benzene to form benzyl chloride in a reaction vessel by passing gaseous hydrogen chloride into a quantity of aqueous reaction mixture containing a quantity of benzene and substantially methanol-free aqueous formaldehyde in the presence of a quantity of zinc chloride, the initial molar ratio of water to zinc chloride in the reaction mixture varying between 3.5 to 4.5:1, cooling the mixture and allowing the mixture to separate into upper and lower layers in the reaction vessel, removing the upper layer containing benzyl chloride while allowing the catalyst-containing aqueous lower layer to remain in the reaction vessel, separating benzyl chloride from the upper layer, regenerating the catalyst in the aqueous lower layer remaining in the reaction vessel by adding benzene to the reaction vessel followed by substantially completely dehydrating the resultant mixture by azeotropic distillation at atmospheric pressure and at a temperature below 100° C., adding substantially the same quantity of benzene, and methanol-free aqueous formaldehyde to the regenerated catalyst in the reaction vessel to form substantially the same quantity of aqueous reaction mixture containing substantially the same quantity of zinc chloride, the molar ratio of water to zinc chloride varying between about 3.5 to 4.5:1, and then repeating the chloromethylating step to obtain again substantially the same quantity of benzyl chloride in high yield.

3. In a process for continuously preparing a quantity of benzyl chloride in high yield, the steps comprising chloromethylating benzene to form benzyl chloride in a reaction vessel by passing gaseous hydrogen chloride into a quantity of aqueous reaction mixture containing a quantity of benzene and substantially methanol-free aqueous formaldehyde in the presence of a quantity of zinc chloride, the initial molar ratio of water to zinc chloride in the reaction mixture being about 4:1, cooling the mixture and allowing the mixture to separate into upper and lower layers in the reaction vessel, removing the upper layer containing benzyl chloride while allowing the catalyst-containing aqueous lower layer to remain in the reaction vessel, separating benzyl chloride from the upper layer, regenerating the catalyst in the aqueous lower layer remaining in the reaction vessel by adding benzene to the reaction vessel followed by substantially completely dehydrating the resultant mixture by azeotropic distillation at atmospheric pressure and at a temperature below 100° C., adding substantially the same quantity of benzene, and methanol-free aqueous formaldehyde to the regenerated catalyst in the reaction vessel to form substantially the same quantity of aqueous reaction mixture containing substantially the same quantity of zinc chloride, the molar ratio of water to zinc chloride being about 4:1, and then repeating the chloromethylating step to obtain again substantially the same quantity of benzyl chloride in high yield.

4. In a process for continuously preparing benzyl chloride in substantially pure form and in high yield, the steps which comprise reacting at a temperature of about 58°–63° C. a mixture containing a quantity of benzene and a quantity of substantially methanol-free aqueous formaldehyde in the presence of a quantity of zinc chloride, the molar ratio of water to zinc chloride in the reaction mixture being between 3.5 to 4.5:1, passing gaseous hydrogen chloride into the reaction mixture, cooling said mixture, removing the upper layer of said reaction mixture containing benzyl chloride wihle allowing the catalyst-containing aqueous lower layer to remain in the reaction vessel, washing said layer containing benzyl chloride with water and an alkali-bicarbonate solution, distilling the resulting solution at about 60 mm. pressure, collecting the portion boiling off between 96°–98° C. to obtain a quantity of substantially pure benzyl chloride, adding benzene to said lower layer remaining in said reaction vessel, substantially completely dehydrating the benzene-zinc chloride mixture by azeotropic distillation at temperature below 100° C. to obtain substantially the same quantity of anhydrous zinc chloride and then adding thereto substantially the same quantity of benzene and substantially the same quantity of substantially methanol-free aqueous formaldehyde, the molar ratio of water to zinc chloride in the reaction mixture being between 3.5 to 4.5:1, reacting the mixture at a temperature varying between 58°–63° C., passing gaseous hydrogen chloride into said mixture followed by cooling to separate the mixture into two layers, removing the upper layer of said mixture containing benzyl chloride, washing said upper layer with water and an alkali-bicarbonate solution, distilling the resulting solution at about 60 mm. pressure, and collecting the portion boiling off between 96°–98° C. to obtain substantially the same quantity of pure benzyl chloride.

References Cited in the file of this patent

UNITED STATES PATENTS 2,541,408    Cockerille _____ Feb. 13, 1951

OTHER REFERENCES

Ginsburg et al.: "Industrial and Engineering Chemistry," vol. 38, pages 478–85 (1946).